United States Patent
Zhu

(10) Patent No.: US 11,846,533 B2
(45) Date of Patent: Dec. 19, 2023

(54) METHOD FOR CORRECTING AT LEAST ONE MEASURED VALUE OF A CORIOLIS MEASURING DEVICE AND SUCH A CORIOLIS MEASURING DEVICE

(71) Applicant: Endress+Hauser Flowtec AG, Reinach (CH)

(72) Inventor: Hao Zhu, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 220 days.

(21) Appl. No.: 17/288,965

(22) PCT Filed: Sep. 18, 2019

(86) PCT No.: PCT/EP2019/075069
§ 371 (c)(1),
(2) Date: Apr. 27, 2021

(87) PCT Pub. No.: WO2020/088837
PCT Pub. Date: May 7, 2020

(65) Prior Publication Data
US 2021/0404850 A1 Dec. 30, 2021

(30) Foreign Application Priority Data
Oct. 29, 2018 (DE) .................... 10 2018 126 905.6

(51) Int. Cl.
*G01F 1/84* (2006.01)
*G01K 13/00* (2021.01)

(52) U.S. Cl.
CPC .......... *G01F 1/8477* (2013.01); *G01F 1/8422* (2013.01); *G01F 1/8427* (2013.01);
(Continued)

(58) Field of Classification Search
None
See application file for complete search history.

(56) References Cited

U.S. PATENT DOCUMENTS 6,360,579 B1  3/2002  De Boom et al.
6,457,372 B1  10/2002  Laursen et al.
(Continued)

FOREIGN PATENT DOCUMENTS

CN  1328636 A  12/2001
CN  1513110 A  7/2004
(Continued)

*Primary Examiner* — Harshad R Patel
(74) *Attorney, Agent, or Firm* — Christopher R. Powers; Endress+Hauser (USA) Holding, Inc.

(57) ABSTRACT

A method for correcting a measured value of a measured variable with reference to a medium flowing through at least two measuring tubes, wherein each measuring tube is excited by an oscillation exciter to execute oscillations, and wherein the oscillations of each measuring tube are registered by oscillation sensors, wherein an electronic circuit monitors at least two of the following measured variables or, in each case, a measured variable derived therefrom: phase difference between measurement signals, resonant frequency, ratio of an oscillation exciter electrical current amplitude to a measuring tube oscillation amplitude, the method including: determining a plausibility; and, wherein upon failing a plausibility requirement of at least one of the measured variables, determining measured values of the measured variables of at least one, first/second measuring tube as a function of corresponding measured values of the measured variables of at least one, second/first measurement tube.

15 Claims, 3 Drawing Sheets

(52) U.S. Cl.
CPC .......... *G01F 1/8431* (2013.01); *G01F 1/8436* (2013.01); *G01K 13/00* (2013.01)

(56) References Cited

U.S. PATENT DOCUMENTS

| | | |
|---|---|---|
| RE40,095 E | 2/2008 | Dutton |
| 2004/0216509 A1 | 11/2004 | Antonijevic |
| 2005/0229719 A1 | 10/2005 | Rieder et al. |
| 2012/0073384 A1 | 3/2012 | Rieder |
| 2013/0125612 A1 | 5/2013 | Hays et al. |
| 2016/0245074 A1 | 8/2016 | Schollenberger et al. |
| 2019/0154486 A1* | 5/2019 | Zhu ...................... G01F 1/8436 |

FOREIGN PATENT DOCUMENTS

| | | |
|---|---|---|
| CN | 1894561 A | 1/2007 |
| CN | 102735299 A | 10/2012 |
| CN | 103052868 A | 4/2013 |
| CN | 103119404 A | 5/2013 |
| CN | 103180695 A | 6/2013 |
| CN | 105705911 A | 6/2016 |
| CN | 108700453 A | 10/2018 |
| DE | 102016007905 A1 | 1/2018 |
| DE | 102016112002 A1 | 1/2018 |
| EP | 2485020 A1 | 8/2012 |
| JP | 2011058950 A | 3/2011 |
| WO | 0019175 A1 | 4/2000 |
| WO | 2018114402 A1 | 6/2018 |

* cited by examiner

METHOD FOR CORRECTING AT LEAST ONE MEASURED VALUE OF A CORIOLIS MEASURING DEVICE AND SUCH A CORIOLIS MEASURING DEVICE

CROSS-REFERENCE TO RELATED APPLICATIONS

The present application is related to and claims the priority benefit of German Patent Application No. 10 2018 126 905.6, filed on Oct. 29, 2018, and International Patent Application No. PCT/EP2019/075069, filed on Sep. 18, 2019, the entire contents of which are incorporated herein by reference.

TECHNICAL FIELD

The invention relates to a method for correcting at least one measured value of a measured variable with reference to a medium flowing through at least two measuring tubes, wherein measured values are registered with a Coriolis measuring device. The invention relates also to such a Coriolis measuring device.

BACKGROUND

Coriolis measuring devices with measured value correction are known, such as shown in USRE40095E. Such a Coriolis measuring device comprises two measuring tubes, which are caused to execute oscillations. Oscillation sensors register measuring tube oscillations, such that from measurement signals registered by means of the oscillation sensors measured values of measured variables can be calculated. For the case, in which the measurement signals are not of sufficient quality, USRE40095E teaches the use of historical data, in order to replace current measurement signals of poor quality with the historical data.

Such is, however, a disadvantageous solution, since historical data can, at most, be taken into consideration for the replacement of current data only after some short delay.

SUMMARY

An object of the invention is, consequently, to provide an improved method for correcting a measured value and a Coriolis measuring device for implementing the method.

The object is achieved by a method as defined in the present disclosure and by a Coriolis measuring device as defined in the present disclosure.

In the case of a method of the invention for correcting at least one measured value of a measured variable with reference to a medium flowing through at least two measuring tubes, measured values are registered with a Coriolis measuring device, wherein the Coriolis measuring device has a first group of measuring tubes and a second group of measuring tubes with, in each case, at least one measuring tube for conveying the medium as well as at least one oscillation exciter as well as at least two oscillation sensors, wherein each measuring tube is excited by means of at least one oscillation exciter to execute oscillations, and wherein the oscillations of each measuring tube are registered by means of at least two oscillation sensors, wherein the measuring tubes of different groups are decoupled from one another, wherein an electronic measuring/operating circuit of the Coriolis measuring device monitors, in each case, at least one of the following measured variables or, in each case, a measured variable derived therefrom, in the case of at least one, first measurement tube as well as at least one, second measuring tube:

phase difference between measurement signals of at least two oscillation sensors, resonant frequency, oscillation exciter electrical current amplitude, measuring tube oscillation amplitude, wherein in a first method step for the at least one measuring tube of the first group and for the at least one measuring tube of the second group, in each case, a plausibility is ascertained based on at least one of the monitored measured variables, wherein upon failing a plausibility requirement in the case of at least one of the measured variables registered by means of the at least one, first/second group, in a second method step, measured values of the measured variables of the first first/second group are ascertained as a function of corresponding measured values of the measured variables registered by means of the at least one, second/first group.

The decoupling of the first group and the second group from one another can be assured by a difference between eigenfrequencies of the measuring tubes of the n different groups. For example, the difference is greater than 5 Hz, and preferably greater than 10 Hz and, especially, greater than 15 Hz.

The decoupling can be assured, for example, as a result of geometric differences between the measuring tubes of different groups.

A derived measured variable of a phase difference is, for example, a mass flow of the medium.

A derived measured variable of a resonant frequency is, for example, a media density.

A derived measured variable of a ratio of an oscillation exciter electrical current amplitude to a measuring tube oscillation amplitude is, for example, a damping.

A derived measured variable of an oscillation exciter electrical current amplitude is, for example, a viscosity of the medium.

A derived measured variable of at least one of these measured variables is a Reynolds number of the medium.

In an embodiment, a maintaining of a plausibility requirement requires fulfillment of at least one of the following criteria: measured values of the at least one measured variable lie in a desired measured value range; and a first and/or second time derivative of a measured value function of time of the at least one measured variable lies, in each case, within its desired range.

In an embodiment, in the case of non-fulfillment of the plausibility requirement by the first group and by the second group, a first plausibility value for the first group as well as a second plausibility value for the second group are ascertained, wherein measured values of measured variables registered by means of a less plausible group are corrected by means of corresponding measured values of measured variables registered by means of the more plausible group, wherein in the case of ascertaining a plausibility value at least one of the following criteria is taken into consideration: deviation of measured values from the desired measured value range; and deviation of the first and/or second time derivative of a measured value function of time of the at least one measured variable from the desired range.

Thus, for example, a relative or absolute deviation from a middle or a limit of the desired measured value range, or desired range, can be taken into consideration as a measure for a plausibility. A relative deviation can be referenced to a width of the desired range, or desired measured value range, or to an absolute value of the middle or a limit.

One skilled in the art can choose a desired range, or desired measured value range, according to requirements, experience or expectations.

In an embodiment, in the case of non-fulfillment of the plausibility requirement by the first group and by the second group, current measured values are replaced by historical measured values measured before non-fulfillment of the plausibility requirement.

In an embodiment, the desired measured value range and/or the desired range is predetermined, especially measuring station specifically, or wherein the desired measured value range and/or the desired range is determined based on corresponding earlier measured values and/or measured value function of time.

In an embodiment, a preceding time range of at least 5 minutes, and, especially, at least 15 minutes and preferably at least 30 minutes is taken into consideration, and/or wherein a preceding time range of at most 240 minutes, and, especially, at most 180 minutes and preferably at most 120 minutes is taken into consideration.

In an embodiment, a derived measured variable of a measured variable is from the following list: oscillation damping, mass flow, density, viscosity, Reynolds number.

In an embodiment, the at least one measuring tube of the first group has different oscillation characteristics compared with the at least one measuring tube of the second group, wherein the at least one measuring tube of the first group as well as the at least one measuring tube of the second group are excited with different oscillation frequencies.

In an embodiment, a correction factor is applied for the measured value correction of the second/first measurement tube, wherein the correction factor takes into consideration at least one of the following properties of the at least one, first measurement tube as well as of the at least one, second measuring tube: flow resistance, temperature, length, diameter.

In an embodiment, two measuring tubes of the first group as well as two measuring tubes of the second group are caused pairwise, in each case, by means of at least one oscillation exciter to oscillate with opposite phase, and wherein measuring tube oscillations of the two measuring tubes of the first group as well as of the two measuring tubes of the second group are detected pairwise, in each case, by means of at least two oscillation sensors.

A Coriolis measuring device adapted for implementing the method of the invention comprises:

a first group of measuring tubes having at least one measuring tube for conveying a medium and a second group of measuring tubes having at least one measuring tube for conveying a medium, wherein each measuring tube has an inlet and an outlet;

at least one oscillation exciter, which is adapted to excite the measuring tubes to execute oscillations;

at least two oscillation sensors, which are adapted to register oscillations of the measuring tube;

an electronic measuring/operating circuit, which is adapted to operate the oscillation exciter as well as the oscillation sensors and to determine and to output mass flow-, and/or flow velocity-, and/or density measured values as well as to execute the method;

a support body, which is adapted to support the measuring tubes, wherein the Coriolis measuring device especially has an electronics housing for housing the electronic measuring/operating circuit.

In an embodiment, at at least one measuring tube of the first group as well as at at least one measuring tube of the second group, in each case, at least one temperature detector is arranged, which is adapted to register a temperature of the corresponding measuring tube, wherein the electronic measuring/operating circuit is adapted to operate the temperature detector.

In an embodiment, the measuring device includes at the inlet as well as at the outlet of the at least one measuring tube, in each case, a securement apparatus, which is adapted to define position, in each case, of an outer oscillatory node, wherein the securement apparatus comprises, for example, at least one plate, which at least partially embraces at least one measuring tube.

BRIEF DESCRIPTION OF THE DRAWINGS

The invention will now be described based on examples of embodiments presented in the appended drawing, the figures of which show as follows.

DETAILED DESCRIPTION

Figure 1B:
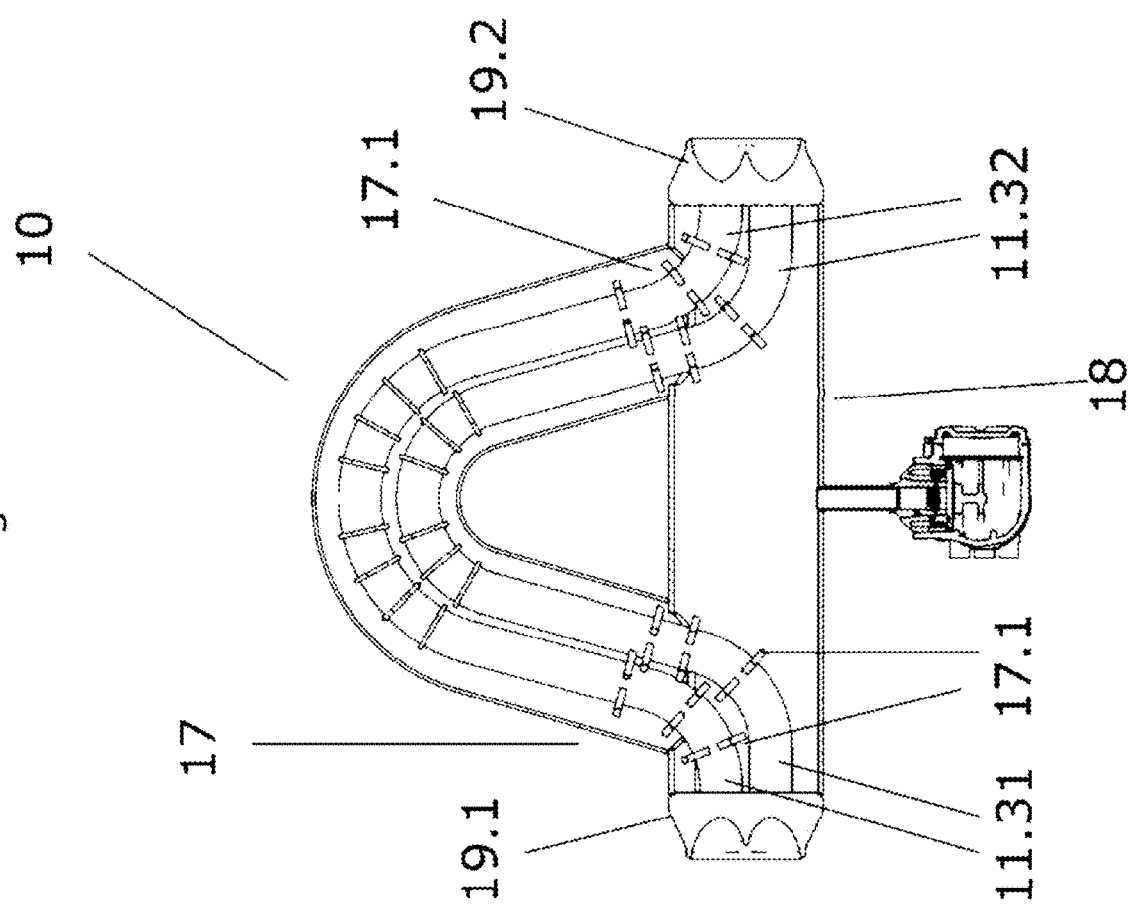
FIGS. 1A and 1B show a construction of a typical Coriolis measuring device in perspective and cross-sectional views, respectively.
Figure 1A:
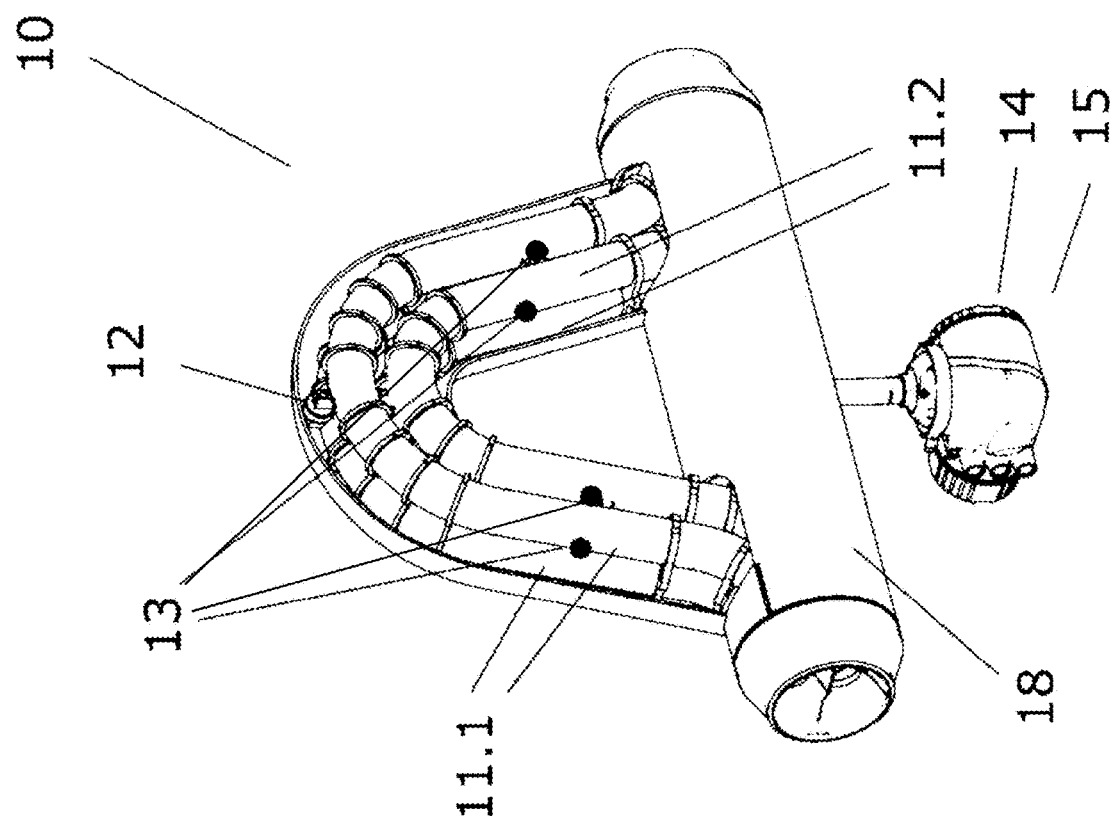

FIG. 1 shows the construction of a Coriolis measuring device 10, wherein the Coriolis measuring device has four measuring tubes 11 with, in each case, an inlet 11.31 and an outlet 11.32, wherein two measuring tubes belong to a first group 11.1 of measuring tubes and two measuring tubes belong to a second group 11.2 of measuring tubes. The Coriolis measuring device includes for each group of measuring tubes, in each case, an oscillation exciter 12, and, in each case, two oscillation sensors 13, which are adapted, respectively, to excite the measuring tubes of its group to execute oscillations and to register their oscillations. The visible oscillation exciter is only schematically shown. Those skilled in the art can select suitable, available oscillation sensors. The Coriolis measuring device includes, furthermore, two manifolds 19 and two process connectors 18. The oscillation exciters are adapted to excite, in each case, two measuring tubes of a first group of measuring tubes 11.1 and two measuring tubes of a second group of measuring tubes 11.2 to execute oscillations relative to one another perpendicularly to a measuring tube longitudinal plane defined, in each case, by the bends of the measuring tubes. The oscillation sensors are adapted to register the oscillations imposed on the measuring tubes of each group of measuring tubes. A first manifold 19.1 on an upstream side of the measuring transducer is adapted to receive a medium flowing from a pipeline into the measuring transducer and to convey such to the inlets of the two measuring tubes, and a second manifold 19.2 is adapted to receive the medium emerging from the outlets of the two measuring tubes and to convey such back into the pipeline. The number of measuring tubes is, in this case, purely by way of example. Thus alternatively, for example, the first group and the second group can have, in each case, only one measuring tube, so that a total of two measuring tubes are present. A securement apparatus 17 comprising, in each case, at least one plate 17.1 defines, in each case, an oscillation node at the measuring tube inlet and one at the measuring tube outlet.

The Coriolis measuring device includes an electronics housing 15, which is adapted to house an electronic measuring/operating circuit 14, which is adapted to operate the oscillation exciter as well as the oscillation sensors and based on oscillation characteristics of the measuring tubes of the groups of measuring tubes, as measured by means of the oscillation sensors, to ascertain and to provide flow measured values and/or density measured values. The Coriolis measuring device can also have one or more temperature detectors (not shown) placed outside on one or more measuring tubes. This allows, for example, determining measuring tube properties influencing the oscillatory behavior of the measuring tube.

Figure 2:
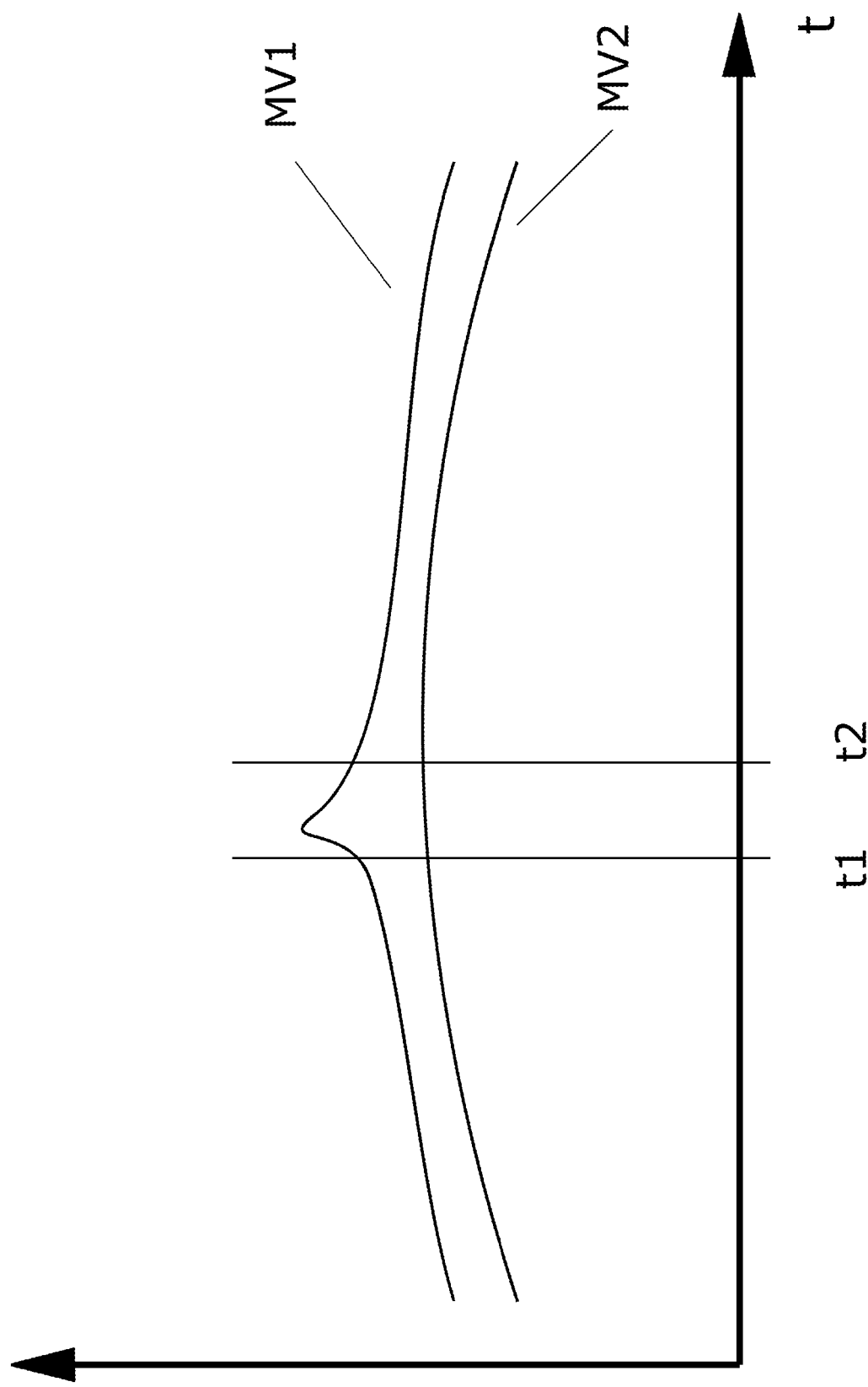
FIG. 2 shows, by way of example, measured value functions of time for two different measured variables.

FIG. 2 shows measured value functions of time of measured variables MV1 and MV2, based on which the method of the invention is explained in the following examples. The measured variables MV1 and MV2 can be two different measured variables, which are registered by means of the at least one measuring tube of the first group or by means of the at least one measuring tube of the second group. The measured variables MV1 and MV2 can also be equal measured variables, which are registered by means of the at least one measuring tube of the first group and by means of the at least one measuring tube of the second group. The measured value functions of time are vertically shifted apart for purposes of illustration. They can be different or essentially equal.

For explaining the method for the case that the measured variables MV1 and MV2 are equal and monitored by different measuring tubes, or groups, thus, the at least one measuring tube of the first group and the at least one measuring tube of the second group, and are expected to have very similar measured values, or very similar measured value functions of time, it should then be assumed that the measured value functions of time except for the time period t1 to t2 are essentially equal. Measured variable MV1 has a measured value function of time like measured variable MV2, except that in the time range t1 to t2 the measured variable MV1 shows a fluctuation of the measured value function of time.

For checking the satisfying of plausibility requirements by the measured value functions of time, it can be checked whether measured values of the at least one measured variable, in this case, MV1, lie in a desired measured value range, and/or whether a first and/or second time derivative of a measured value function of time of the at least one measured variable lies, in each case, within a desired range. In case MV1 does not satisfy the plausibility requirement, then the measured value function of time of the measured variable MV1 in the time range t1 to t2 can be ascertained by means of the measured value function of time of the corresponding measured variable in the case of at least one other measuring tube. One skilled in the art can choose a desired range, or desired measured value range, according to given requirements and estimates.

For the case, in which the measured variable MV1 violates a plausibility requirement, measured values of the measured variable MV2 can be taken into consideration, in order to ascertain the measured value function of time of the measured variable MV1 in a violation period, in this case, from t1 to t2. For example, in the case of measured variables such as density or viscosity, this can mean a replacement. The ascertaining can, however, also take into consideration differences between the at least one measuring tube of the first group and the at least one measuring tube of the second group. Thus, for example, a flow at equal media pressure can be different due to different flow resistances of the at least one measuring tube of the first group 11.1 and the at least one measuring tube of the second group 11.2. Such differences can be accounted for, for example, by means of a factor F. Those skilled in the art can select corresponding procedures.

Corresponding considerations hold for the case, in which both measured variables MV1 and MV2 are measured variables registered by means of either the at least one measuring tube of the first group or the at least one measuring tube of the second group. For example, MV1 can be a phase difference between measurement signals of at least two oscillation sensors of the at least one, first/second measuring tube and, thus, correspond to a mass flow, and MV2 can be a resonant frequency of the at least one measuring tube of the first/second group and, thus, correspond to a media density. In case the measured value functions of time of the two measured variables do not correspond to one another, that can be an indication of insufficient plausibility. In such case, measured values of the measured variables MV1 and MV2 are ascertained by means of corresponding measured values registered by means of the second/first group. It can be advantageous to check the measured variables MV1 and MV2 at the, in each case, other at least one measuring tube. Thus, for example, in the case of turning on a pump a media density can remain constant at the at least one, first measurement tube and at the at least one, second measuring tube, while the mass flow, however, varies greatly, so that, when considering only the at least one, first measurement tube or the at least one, second measuring tube, a situation of lacking plausibility is present. In case, however, such as in this example, the media density remains the same at the at least one measuring tube of the first group and at the at least one measuring tube of the second group, while the mass flow greatly varies, this can indicate the presence of plausible measured values.

Resonance frequency changes at essentially constant mass flow can result, for example, from the presence of gas bubbles in a liquid medium. Gas bubbles lessen also a local density of the liquid medium and influence, thus, an oscillation sensor amplitude. An oscillation sensor amplitude fluctuation can, thus, indicate the presence of gas bubbles and a lacking plausibility. In case the oscillation exciters are so operated that a Coriolis oscillatory mode has a constant amplitude, gas bubbles can have effects on an oscillation exciter electrical current amplitude to be set. Also that can be an indication of gas bubbles and indicate insufficient plausibility. A change, especially an increase of oscillation damping, can also be an indication of a presence of gas bubbles and, thus, insufficient plausibility.

For the case, in which measured values of measured variables of the at least one, first measurement tube and the at least one, second measuring tube are implausible, historical data can be used. Thus, for example, historical data of the at least one, first measurement tube and the at least one, second measuring tube can be provided. For the case, in which for the at least one measuring tube of the first group, or the at least one measuring tube of the second group, historical data are only limitedly usable, for example, because measured values of the at least one measuring tube of the first group, or at least one measuring tube of the second group have been implausible for too long, then historical data of the at least one measuring tube of the second group, or of the at least one measuring tube of the first group, can be used for the at least one measuring tube of the first group, or at least one measuring tube of the second group, as the case may be.

Figure 3:
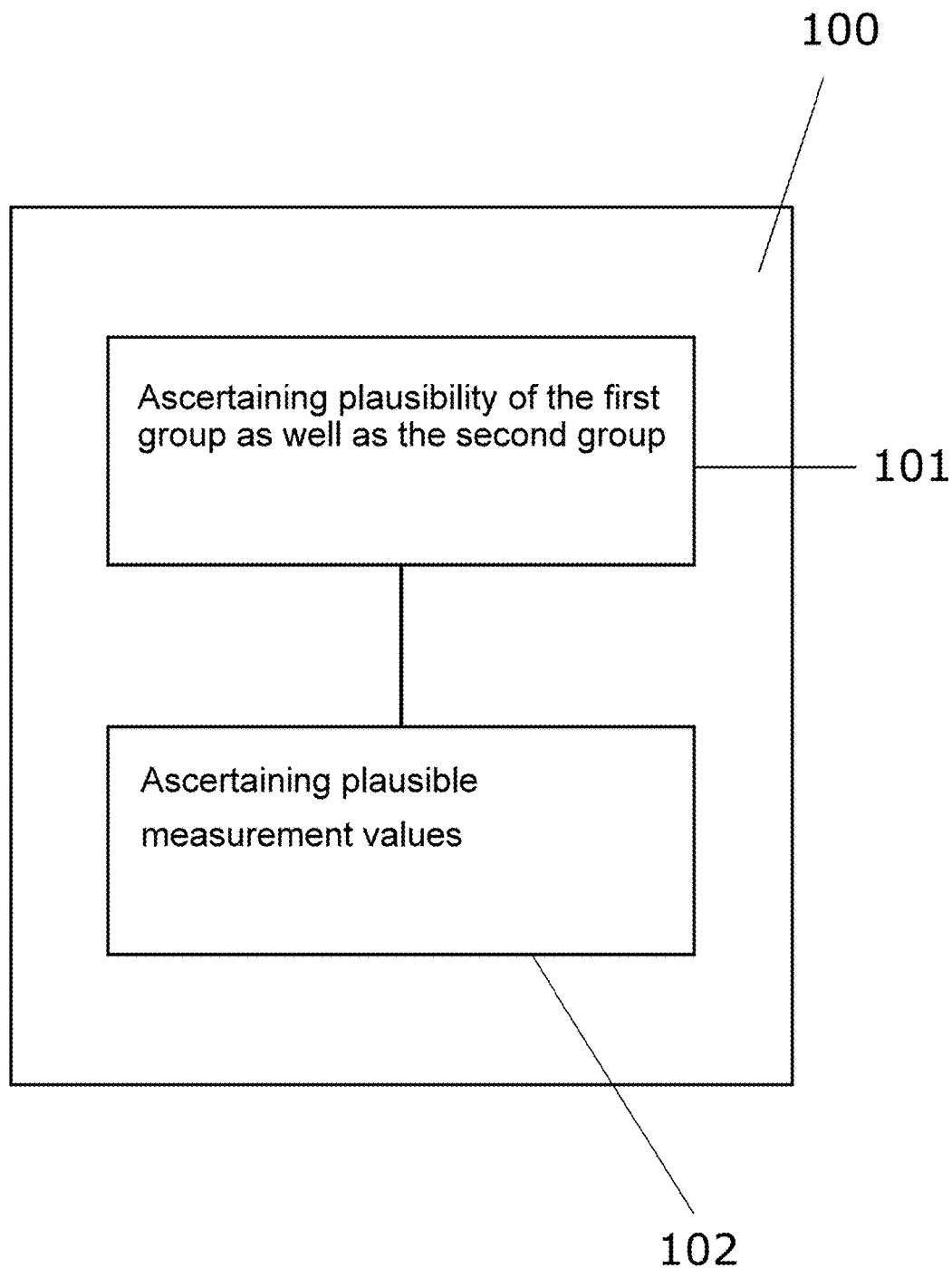
FIG. 3 shows steps of a method of the present disclosure.

FIG. 3 shows schematically the steps of a method 100 of the invention.

In a first method step 101, continuously or in time intervals, a plausibility of the measured values of measured variables of the at least one measuring tube of the first group and the at least one measuring tube of the second group is determined. In the case of establishing that measured values of a measured variable are implausible, such as shown by way of example in FIG. 2 with MV1, then in a second method step 102 plausible measured values are ascertained and used for providing measured values.

The invention claimed is:

1. A method for correcting at least one measured value of a measured variable with reference to a medium flowing through a Coriolis measuring device, by which measured values are registered, wherein the Coriolis measuring device includes a first group of measuring tubes and a second group of measuring tubes each including at least one measuring tube configured to convey the medium, at least one oscillation exciter and at least two oscillation sensors, wherein each measuring tube is excited by the at least one oscillation exciter to execute oscillations, and wherein the oscillations of each measuring tube are registered by the at least two oscillation sensors, wherein measuring tubes of different groups are decoupled from each other, wherein an electronic measuring/operating circuit of the Coriolis measuring device monitors for the first group and the second group of measuring tubes, in each case, at least one of the following measured variables or a measured variable derived therefrom: phase difference between measurement signals of the at least two oscillation sensors; resonant frequency; oscillation exciter electrical current amplitude and measuring tube oscillation amplitude, the method comprising:

determining a plausibility for the at least one measuring tube of the first group and for the at least one measuring tube of the second group, in each case, based on at least one of the monitored measured variables; and when a plausibility requirement is not fulfilled with respect to at least one of the measured variables registered by the first group or second group of measuring tubes, correcting the measured values of the first group or the second group by determining measured values of the measured variables of the first group or second group as a function of corresponding measured values of the measured variables registered by the at least one second group or first group, respectively.

2. The method of claim 1, wherein a maintaining of a plausibility requirement requires fulfillment of at least one of the following criteria:

measured values of the at least one measured variable lie in a desired measured value range; and a first and/or second time derivative of a measured value function of time of the at least one measured variable lies, in each case, within its desired function of time range.

3. The method of claim 2, further comprising:

when the plausibility requirement is not fulfilled with respect to at least one of the measured variables registered by the first group and with respect to at least one of the measured variables registered by the second group, determining a first plausibility value for the first group and a second plausibility value for the second group; and correcting measured values of the measured variables registered by a less plausible group of the first and second groups using corresponding measured values of the measured variables registered by a more plausible group of the first and second groups, wherein determining the first and second plausibility values includes using at least one of the following criteria:

deviation of measured values from the desired measured value range; and deviation of the first and/or second time derivative of a measured value function of time of the at least one measured variable from the desired range.

4. The method of claim 2, wherein the desired measured value range and/or the desired function of time range is predetermined, or wherein the desired measured value range and/or the desired function of time range is determined based on corresponding earlier measured values and/or measured value function of time in a preceding time range.

5. The method of claim 4, wherein the preceding time range of at least 5 minutes and of at most 240 minutes is taken into consideration.

6. The method of claim 4, wherein the preceding time range of at least 30 minutes and of at most 120 minutes is taken into consideration.

7. The method of claim 1, further comprising:

when the plausibility requirement is not fulfilled with respect to at least one of the measured variables registered by the first group and with respect to at least one of the measured variables registered by the second group, replacing current measured values with historical measured values from before not fulfilling the plausibility requirement.

8. The method of claim 1, wherein a derived measured variable of a measured variable is one of oscillation damping, mass flow, density, viscosity and Reynolds number.

9. The method of claim 1, wherein the at least one measuring tube of the first group has different oscillation characteristics compared with the at least one measuring tube of the second group, and wherein the at least one measuring tube of the first group and the at least one measuring tube of the second group are excited with different oscillation frequencies.

10. The method of claim 1, wherein a correction factor is applied for correcting the measured values with reference to at least one measuring tube of the first group and/or the second group, wherein the correction factor takes into consideration at least one of the following properties of the at least one measuring tube of the first group and of the at least one measuring tube of the second group: flow resistance, temperature, length and diameter.

11. The method of claim 1, wherein the at least one measuring tube of the first group includes two measuring tubes and the at least one measuring tube of the second group includes two measuring tubes, which corresponding measuring tubes are caused pairwise, in each case, to oscillate with opposite phase by the at least one oscillation exciter, and wherein measuring tube oscillations of the two measuring tubes of the first group and the two measuring tubes of the second group are detected pairwise, in each case, using at least two oscillation sensors.

12. A Coriolis measuring device adapted for performing a method for correcting at least one measured value of a measured variable with reference to a medium flowing through at least two measuring tubes, the measuring device comprising:

a first group of measuring tubes including at least one measuring tube configured to convey a medium and a second group of measuring tubes including at least one measuring tube configured to convey the medium, wherein each measuring tube has an inlet and an outlet;

at least one oscillation exciter adapted to excite the measuring tubes of the first and second groups to execute oscillations;

at least two oscillation sensors adapted to register the oscillations of the measuring tubes of the first and second groups;

an electronic measuring/operating circuit configured to operate the oscillation exciter and the oscillation sensors and to determine and output mass flow, and/or flow velocity, and/or density measured values and to execute the method according to claim 1;

a support body configured to support the measuring tubes; and an electronics housing embodied to house the electronic measuring/operating circuit.

13. The measuring device of claim 12, wherein at at least one measuring tube of the first group and at at least one measuring tube of the second group, in each case, at least one temperature detector is disposed and adapted to register a temperature of the corresponding measuring tube, and wherein the electronic measuring/operating circuit is configured to operate the temperature detector.

14. The measuring device of claim 12, further comprising at the inlet and at the outlet of the at least one measuring tube of a group, in each case, a securement apparatus configured to define a position, in each case, of an outer oscillatory node, wherein the securement apparatus comprises at least one plate, which at least partially embraces at least one measuring tube.

15. The measuring device of claim 12, further comprising a first manifold and a second manifold, wherein the first manifold is configured to present a flow of medium to the inlets, and wherein the second manifold is configured to collect a flow of medium from the outlets.

* * * * *